Aug. 18, 1959   R. M. WOODWARD   2,900,252
APPARATUS FOR CONTACTING MOLTEN GLASS
Filed June 15, 1954
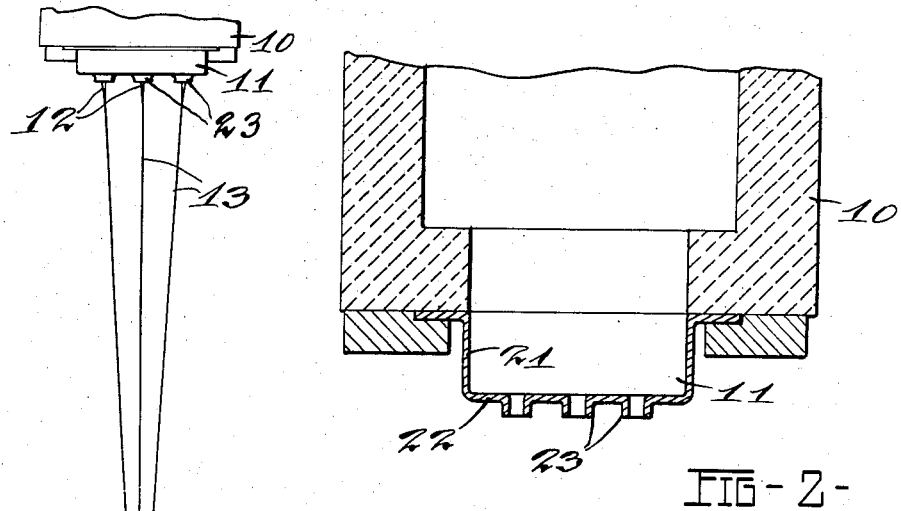
FIG-2-
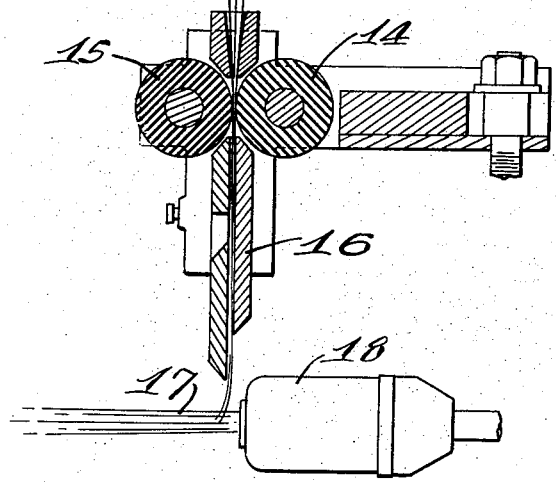
FIG-1-
INVENTOR:
ROBERT M. WOODWARD
BY
*Stachli* & *Overman*
ATTYS.

United States Patent Office 2,900,252
Patented Aug. 18, 1959

2,900,252

APPARATUS FOR CONTACTING MOLTEN GLASS

Robert M. Woodward, Newark, Ohio, assignor to Owens-Corning Fiberglas Corporation, a corporation of Delaware Application June 15, 1954, Serial No. 436,757

9 Claims. (Cl. 75—171)

The present invention relates to apparatus for use in processing of glass in the molten state and it relates more particularly to stirrers, liners, bushing and the like apparatus having portions thereof in contact with molten glass in use, and it relates especially to feeders employed in connection with a glass melting furnace for reducing a body of molten glass into a plurality of small streams and which may comprise a flat or shallow receptacle having small orifices in the bottom wall thereof through which the molten glass flows by gravitational force or is drawn therethrough for attenuation. The invention will be described in particular in connection with a feeder of the type described used in the manufacture of glass fibers of small dimensions, but it will be understood that the invention may be used also in other apparatus in which molten glass is handled.

One of the problems which has existed in the glass industry over a great number of years resides in the fabrication of a feeder which is free of noble metals and which even without such metals can withstand the high temperatures and the severe physical and chemical attacks of molten glass over an appreciable period of time without an objectionable degree of deterioration. To the present, platinum has been used extensively in the portion of such apparatus used in contact with molten glass, but the high cost of platinum and the limited availability thereof militates against its ready adoption and extensive application. As a result, devices adapted for use in handling molten glass and particularly feeders used in forming glass fibers, have lagged far behind other developments in the glass fiber field and have been a constant source of trouble in the art of forming glass fibers at low cost for broadening their fields of application.

Platinum has been used with other metals, such as rhodium, as an alloy in feeders for molten glass. Other alloys of platinum with less expensive metals, such as nickel have been tried in an effort to obtain a satisfactory feeder at lower most. It has been found, however, that such alloys retain many of the serious limitations of platinum and that platinum is still necessary as a major portion thereof, such as in amounts of ninety percent and greater. In addition, elements such as platinum and rhodium tend to volatilize at a relatively rapid rate at the temperature conditions existing at the interface with molten glass to the extent that the apparaus deteriorates too rapidly and the cost thereof becomes excessive.

Aside from the factors of cost and maintenance, feeders and the like glass handling apparatus manufactured of platinum and platinum alloys are generally formed of a number of parts which must be welded together into an integral unit. Welding with platinum is a difficult proposition in that it is a time-consuming operation and requires highly skilled labor, and the difficulty is made greater by the fact that losses of these metals must be kept to an absolute minimum.

One of the major obstacles confronting the use of metal free of platinum or other noble metals used in contact with molten glass resides in the excessive spalling which ordinarily occurs. Spalling may be defined as the reaction which takes place causing oxidation of the exposed surfaces of the metal to form an oxide layer after a short period of use. The formation of an oxide layer would not be so objectionable if it were not for the fact that the oxide layer is brittle and poorly bonded to the underlying surface with the result that the oxide layer chips free of the surface in use and especially upon cooling. Not only does this result in a gradual wearing away of the apparatus, but the oxide chips interfere with the flow of molten glass in the apparatus in which it is handled. For example, the oxide chips may contaminate the melt as stones or plug the orifices of a feeder or guide plate through which continuous glass filaments are drawn for attenuation into fine fibers as by a burner blast of the type disclosed in the U.S. Patent No. 2,489,243. Such oxide layers also spall upon cooling of the apparatus and provide the described wear characteristics and contamination of the melt and products that are formed.

After a relatively short period of service all known feeders become unsatisfactory for further use. For example, the tiny openings or orifices through which the molten glass flows for attenuation for fibers become enlarged by the constant erosion of the glass stream flowing therethrough. In the present operation, such worn feeders are removed from operation and melted down for recovery of the metal. As a result, in addition to the requirement for apparatus in which the portions therefor in contact with molten glass have the properties of a high melting point, chemical and dimensional stability, non-volatility at the temperature of molten glass, and kindred qualtities, other properties which are desired in an apparatus of the type described include the ability to enable casting, forging, reworking, remelting, rerolling, recasting and welding without deterioration of the desirable properties thereof.

It is an object of this invention to provide apparatus such as a feeder for use with molten glass formed of a metal which is free of the noble metals.

Another object is to provide apparatus of the type described which may be formed by casting into intricate forms such as a feeder and thereby to minimize the steps of welding and the like heretofore required in the fabrication of such devices.

A further object is to provide apparatus of the type described formed of a metal which is substantially free of spalling upon cooling or while in use and thereby is relatively free of interference with the processing of the molten glass, and in which has relatively long life in use.

Other objects include producing an apparatus of the type described of an alloy having high melting point, which is chemically stable at the temperature of molten glass, that is dimensionally stable and non-volatile at this temperature, which withstands the severe chemical and physical attacks, which resists erosion by the molten glass, and which may be worked, rolled, melted, cast, machined, drilled and welded without substantial change in properties.

These and other objects and advantages of this invention will become apparent from the following description given by way of illustration but not by way of limitation.

The objects of the present invention are achieved by the manufacture of an apparatus for use with molten glass in which the areas in contact with the glass are formed of an alloy in which the alloying elements comprise copper, in amounts ranging from 0.5 to a maximum of 3.5 percent by weight, chromium in amounts ranging from 10 percent to a maximum of 35 percent by weight, with the remainder formed of nickel and in which the amount of impurities in the form of silicon is less than 0.5 percent by weight and in the form of iron is preferably less than 0.1 percent by weight.

Neither of these metals, such as nickel, chromium or copper alone or any two of them in combination are capable of use in an apparatus in contact with molten glass. These metals, alone or in any combination of two of them, oxidize readily and they are characterized by physical properties incapable of withstanding the conditions existing. It has been found, however, that when these three elements are combined in the described ratio in accordance with the practice of this invention, unusual and unexpected properties are developed which for the first time enables the successful use of the alloy in apparatus in contact with molten glass and which fulfills the objectives of this invention.

Oxidation occurs at the surface in use but the oxide layer that is formed on the exposed surfaces of the alloy is thin and, in direct contrast to results experienced with oxide layers similarly formed of other metals and alloys, the oxide layer is unexpectedly free of spalling or chipping even after extended periods of contact with molten glass, or upon cooling. In fact, the oxide layer that is formed tends to cling to the surface so strongly that repeated blows with a hammer or the like fails to produce noticeable chips or flakes. After exposure for one hundred hours at 2200 degrees F., little if any change in appearance has been observed. Although the oxide layer that is formed is thin, it has been found to be of high density. Analysis indicates the presence of copper, chromium and nickel in the composition of the oxide layer in substantially the same proportions as in the alloy.

Copper is believed to constitute one of the important components in the alloy system used in the manufacture of the apparatus in contact with molten glass. When less than 0.5 percent by weight of copper is present in the alloy, the unexpected properties of the alloy are lost. The oxide layer becomes less dense and spalling occurs while the apparatus is in use or upon cooling. The use of copper in amounts greater than 3.5 percent by weight results in an undesirable decrease in the melting point of the alloy.

When less than 10 percent by weight of chromium is present, resistance to oxidation is markedly decreased. If more than 35 percent of chromium is present in the alloy, the alloy becomes so hard and brittle as to militate against economical manufacture into the desired feeder or bushing, and the structure formed becomes deficient in its chemical properties and even in its physical properties, and the material can not be formed into intricate structures in an economical manner.

It is preferred to make use of the elements in a glass feeder or bushing in amounts ranging from 0.5 to 2.0 percent by weight of copper, 12.0 to 20.0 percent by weight chromium and 78.0 to 87.5 percent by weight nickel and best use as a feeder is made of a composition containing 1.0 percent by weight copper, 15 percent by weight chromium and 84.0 percent by weight nickel. When silicon in amounts greater than 0.5 percent by weight is present as an impurity in the alloy, the oxide layer no longer adheres tightly and the oxide layer also becomes less dense with the result that spalling and wear readily occurs. Iron in amounts greater than 0.1 percent by weight also appears to detract from the properties of the alloy with the result that it is preferred to consider silicon, iron and possibly manganese and magnesium as undesirable impurities.

A composition of the type described, embodying features of this invention, has been found to be characterized by properties which enable working such as casting, forging, hot-rolling and the like into complicated shapes. One method of fabricating comprises the preparation first of a virgin cast and then remelting and recasting the initial product into the desired final product.

More particularly, in preparing a melt as of 7070 grams, the nickel and chromium are melted together in a suitable refractory crucible which may be heated, as by electrical means. This operation does not necessarily require an inert atmosphere and may therefore be carried out in air. When the melt forms, addition is made of a deoxidizing agent of the conventional type used in metallurgical practice. It is preferred, however, to make use of a deoxidizing agent having the following composition in percent by weight:

59 percent silicon
    20 percent calcium
    18 percent manganese
    3 percent inert matter After adding 40 grams of the deoxidizer, heating is continued for about thirty seconds after which the copper is added. Following another heating period an additional 20 grams of the deoxidizer is added and the melt poured to form billets.

To prepare a final casting of 4,200 grams, the billet is cut into scrap for remelting. When the melt is reduced to condition for pouring, about 10 grams of the deoxidizer are added and heating is continued for about two minutes. Finally, after the heat is turned off, 10 grams of another deoxidizer formed of equal parts by weight of nickel and magnesium are added and the melt may be poured for casting into suitable molds or, in the alternative, the melt may be poured into a blank for forging or the like.

While the deoxidizing agent remains behind as a slag in the melting crucible, some of the slag will find its way into the product to form an impurity. These impurities are chiefly those selected from the group of elements consisting of silicon, iron, manganese, magnesium and calcium, present in the fluxes or deoxidizing agents although others may be present. Ordinarily, the total amount of impurities should not be greater than 1.5 percent and preferably not greater than 1.0 percent by weight. Not more than 0.5 percent of any one impurity should be present.

For illustration, description will be made of a feeder for flowing streams of molten glass in the manufacture of glass fibers. An example of a feeder embodying features of this invention is illustrated in the drawings in which:

Fig. 1 is a diagrammatic, elevational view partially in section of a feeder for forming glass fibers; and Fig. 2 is a fragmentary cross-sectional view of the feeder of Fig. 1.

In accordance with the invention, the feeder 11 comprises the novel alloy disclosed. The side walls 21, bottom plate 22, and cylindrical nipple 23 are either cast or fabricated, utilizing welding techniques, from the copper, chromium, and nickel alloy.

The invention is shown in association with a tank 10 of molten glass and comprises a feeder 11 which issues a plurality of streams 12 of molten glass that are attenuated into filaments 13 by coacting pull rollers 14 and 15. The rollers may be driven by any suitable means. After emerging from between the rollers, the filaments pass through vertically disposed troughs in a guide plate 16. The function of the guide plate is to direct the continuous filaments 13 in a desired path and maintain them in definite spaced-apart relation.

At the lower end of the plate 16, the filaments feed into a high speed gaseous blast 17 from a burner 18. The blast moves in a path that is substantially at a right angle to the direction of travel of the filaments. This blast is so intensely hot and moves at such a tremendous velocity that as the filaments move into its path, they are melted and drawn out by the force of the blast into fine glass fibers. The fibers are borne by the burner blast to a suitable collecting means such as an endless foraminous conveyor. A full description of this process is disclosed in United States Patent No. 2,489,243 to Stalego.

Referring now to the fragmentary enlarged view of Figure 2, the tank 10 communicates through a conventional opening with the feeder 11. Or if desired, it is possible to feed batch directly into the feeder and melt it by heating the walls of the feeder as by passing electric current therethrough.

The feeder itself may take the form of a four-walled container having side walls 21 and a bottom plate 22. The plate 22 has a plurality of openings from which glass streams 12 issue, each opening being the hollow core of a cylindrical nipple 23.

In addition to being free of noble metals, another important advantage of the present invention is that it may be readily cast into intricate shapes, such as that of a feeder, instead of being fabricated in a time-consuming, welding operation. In fact, entire feeders have been successfully cast from the present apparatus after which the nipples 23 are drilled to size.

However, if desired, apparatus of the present invention may be formed by fusing or welding together various parts prepared by casting, forging, and the like. In this instance, the welding technique required is not as tedious or skillful as when welding parts comprising platinum or platinum alloys. As an example of parts fabrication, the plate 22 and nipples 23 may be cast integrally in a conventional mold and the nipples subsequently drilled to size. The plate may then be welded to side walls which are of the same composition or of a different composition, for instance, of nickel-tungsten or iron chromium alloys. To effect the weld, a rod of Nichrome or one comprising copper, chromium, and nickel in the presently disclosed proportions may be used.

This application is a continuation-in-part of my co-pending application Serial No. 212,660, filed February 24, 1951, now abandoned, entitled "Apparatus for Contacting Molten Glass."

Modifications and variations may be resorted to within the spirit and scope of the appended claims.

I claim:

1. In a glass working and handling apparatus, a container for molten glass having portions in direct contact with the molten glass, said portions consisting of from 0.5 up to 3.5 percent by weight copper, 10.0 to 35.0 percent by weight chromium, the remainder being nickel except for impurities in amounts less than 1.5 percent by weight.

2. In a glass working and handling apparatus, a container for molten glass having portions in direct contact with the molten glass, said portions consisting of from 0.5 up to 3.5 percent by weight copper, 10.0 to 35.0 percent by weight chromium, 60.0 to 89.5 percent by weight nickel and less than 1.5 percent by weight impurities including a maximum of 0.5 percent by weight silicon and 0.1 percent by weight iron.

3. In a glass working and handling apparatus, a container for molten glass having portions in direct contact with the molten glass, said portions consisting of from 0.5 to 2.0 percent by weight copper, 12.0 to 20.0 percent by weight chromium, 78.0 to 84.0 percent by weight nickel, and less than 1.0 percent by weight impurities in which the maximum of any one is 0.5 percent by weight.

4. In a glass working and handling apparatus, a container for molten glass having portions in direct contact with the molten glass, said portions consisting of from 0.5 to 2.0 percent by weight copper, 12.0 to 20.0 percent by weight chromium, and 78.0 to 84.0 percent by weight nickel.

5. An apparatus as claimed in claim 1 in which the housing is a feeder for glass having openings through which the molten glass flows for issuance from the feeder as continuous streams.

6. In a glass working and handling apparatus, a container for molten glass having a feeder in the bottom wall through which streams of molten glass flow, portions of said container and feeder being in direct contact with the molten glass, said portions consisting of from 0.5 up to 3.5 percent by weight copper, 10.0 to 35.0 percent by weight chromium, the remainder being nickel except for impurities in amounts less than 1.5 percent by weight, the surfaces of the alloy in direct contact with the molten glass having a thin oxide film of the alloy which is strongly bonded to the underlying alloy.

7. In a glass working and handling apparatus, a container for molten glass having a feeder in the bottom wall through which streams of molten glass flow, portions of said container and feeder being in direct contact with the molten glass, said portions consisting of from 0.5 up to 3.5 percent by weight copper, 10.0 to 35.0 percent by weight chromium, 60.0 to 89.5 percent by weight nickel and less than 1.5 percent by weight impurities including a maximum of 0.5 percent by weight silicon and 0.1 percent by weight iron, the surfaces of the alloy in direct contact with the molten glass having a thin oxide film of the alloy which is strongly bonded to the underlying alloy.

8. In a glass working and handling apparatus, a container for molten glass having a feeder in the bottom wall through which streams of molten glass flow, portions of said container and feeder being in direct contact with the molten glass, said portions consisting of from 0.5 to 2.0 percent by weight copper, 12.0 to 20.0 percent by weight chromium, 78.0 to 84.0 percent by weight nickel, and less than 1.0 percent by weight impurities in which the maximum of any one is 0.5 percent by weight, the surfaces of the alloy in direct contact with the molten glass having a thin oxide film of the alloy which is strongly bonded to the underlying alloy.

9. In a glass working and handling apparatus, a container for molten glass having a feeder in the bottom wall through which streams of molten glass flow, portions of said container and feeder being in direct contact with the molten glass, said portions consisting of from 0.5 to 2.0 percent by weight copper, 12.0 to 20.0 percent by weight chromium, and 78.0 to 84.0 percent by weight nickel, the surfaces of the alloy in direct contact with the molten glass having a thin oxide film of the alloy which is strongly bonded to the underlying alloy.

References Cited in the file of this patent

UNITED STATES PATENTS

| | | |
|---|---|---|
| 1,115,239 | Parr | Oct. 27, 1914 |
| 1,168,074 | Hunter | Jan. 11, 1916 |
| 1,203,180 | Brix | Oct. 31, 1916 |
| 2,109,285 | Brown | Feb. 22, 1938 |
| 2,266,117 | Crocker | Dec. 16, 1941 |
| 2,343,039 | Allen | Feb. 29, 1944 |
| 2,607,170 | De Vries | Aug. 19, 1952 |
| 2,711,054 | Urbanetti | June 21, 1955 |

OTHER REFERENCES

Engineering Experiment Station, University of Illinois, vol. 8, Bulletin No. 93 (McFarland et al.), pages 5–57 (1916) (pages 7 and 9 relied on).